(12) United States Patent
Tucker et al.

(10) Patent No.: US 7,354,959 B2
(45) Date of Patent: *Apr. 8, 2008

(54) WATER-BASED INKS FOR HYDROGEL LENSES

(75) Inventors: Robert C. Tucker, Suwanee, GA (US); Sandra Corti, Suwanee, GA (US); Joshua Wallach, Portsmouth, VA (US)

(73) Assignee: Novartis AG, Basel (CH)

( * ) Notice: Subject to any disclaimer, the term of this patent is extended or adjusted under 35 U.S.C. 154(b) by 144 days.

This patent is subject to a terminal disclaimer.

(21) Appl. No.: 11/248,548

(22) Filed: Oct. 12, 2005

(65) Prior Publication Data

US 2007/0027228 A1    Feb. 1, 2007

Related U.S. Application Data

(63) Continuation of application No. PCT/EP2005/008159, filed on Jul. 27, 2005.

(60) Provisional application No. 60/591,704, filed on Jul. 30, 2004.

(51) Int. Cl.
    *C08F 2/46*    (2006.01)

(52) U.S. Cl. .............. 522/84; 522/86; 522/90; 522/96; 522/71; 522/74; 522/150; 522/151; 522/152; 523/160; 523/105; 523/106; 351/160

(58) Field of Classification Search .............. 522/86, 522/85, 90, 96, 84, 71, 74, 150, 151, 152; 106/31.13; 264/2.23; 523/105, 106, 160; 351/160

See application file for complete search history.

(56) References Cited

U.S. PATENT DOCUMENTS

| | | | |
|---|---|---|---|
| 3,476,499 A | 11/1969 | Wichterle | 8/4 |
| 3,536,386 A | 10/1970 | Spivack | 351/160 |
| 3,679,504 A | 7/1972 | Wichterle | 156/62 |
| 3,712,718 A | 1/1973 | LeGrande | 351/160 |
| 4,252,421 A | 2/1981 | Foley, Jr. | 351/162 |
| 4,405,773 A | 9/1983 | Loshack | 526/317 |
| 4,460,523 A | 7/1984 | Neefe | 264/1.9 |
| 4,468,229 A | 8/1984 | Su | 8/507 |
| 4,472,327 A | 9/1984 | Neefe | 264/1.9 |
| 4,582,402 A | 4/1986 | Knapp | 351/162 |
| 4,634,449 A | 1/1987 | Jenkins | 8/507 |
| 4,639,105 A | 1/1987 | Neefe | 351/162 |
| 4,668,240 A | 5/1987 | Loshack | 8/507 |
| 4,704,017 A | 11/1987 | Knapp | 351/177 |
| 4,719,657 A | 1/1988 | Bawa | 8/483 |
| 4,744,647 A | 5/1988 | Meshel | 351/177 |
| 4,857,072 A | 8/1989 | Narducy | 8/507 |
| 4,954,132 A | 9/1990 | Hung | 8/507 |
| 4,963,159 A | 10/1990 | Narducy | 8/507 |
| 5,034,166 A | 7/1991 | Rawlings | 264/1.7 |
| 5,116,112 A | 5/1992 | Rawlings | 351/162 |
| 5,120,121 A | 6/1992 | Rawlings | 351/162 |
| 5,272,010 A | 12/1993 | Quinn | 428/411 |
| 5,414,477 A | 5/1995 | Jahnke | 351/162 |
| 5,452,658 A | 9/1995 | Shell | 101/401.1 |
| 5,637,265 A | 6/1997 | Misciagno | 264/1.7 |
| 5,793,466 A | 8/1998 | Moncada | 351/162 |
| 5,936,705 A | 8/1999 | Ocampo | 351/162 |
| 6,030,078 A | 2/2000 | Ocampo | 351/162 |
| 6,132,043 A | 10/2000 | Atkins | 351/162 |
| 6,164,777 A | 12/2000 | Li | 351/162 |
| 6,284,161 B1 | 9/2001 | Thakrar | 264/1.7 |
| 6,315,410 B1 | 11/2001 | Doshi | 351/162 |
| 6,337,040 B1 | 1/2002 | Thakrar | 264/1.7 |
| 6,465,538 B2 | 10/2002 | Lai | 522/64 |
| 6,523,953 B2 | 2/2003 | Jahnke | 351/162 |
| 2001/0050753 A1 | 12/2001 | Tucker | 351/177 |
| 2003/0054109 A1 | 3/2003 | Quinn | 427/385.5 |
| 2003/0100627 A1 | 5/2003 | Bishop et al. | 522/153 |
| 2003/0119943 A1 | 6/2003 | Tucker | 523/160 |

(Continued)

FOREIGN PATENT DOCUMENTS

EP    0 352 134    7/1989

(Continued)

OTHER PUBLICATIONS

European Standard Search Report (Nov. 7, 2005).

(Continued)

*Primary Examiner*—Sanza L McClendon
(74) *Attorney, Agent, or Firm*—Sheng-Hsin Hu; Jian Zhou

(57) ABSTRACT

The present invention is related to water-based inks for making colored hydrogel contact lenses, in particular, colored HEMA-based hydrogel contact lenses. The ink of the invention comprises at least one colorant, water, and a water-soluble and actinically-curable binder polymer which is a vinyl group-terminated polyurethane polymer, a vinyl group-terminated polyurea binder polymer, or a mixture thereof. Also, the ink of the invention is characterized by having a viscosity greater than 50 centipoise (cps), a prolonged stability, and a good adhesion to a HEMA-based hydrogel contact lens. The ink of the invention preferably further has a good compatibility with a HEMA-based hydrogel material, and/or good transferability from a mold to a HEMA-based hydrogel contact lens made in the mold. The present invention is also related to a method for making colored hydrogel contact lenses using an ink of the invention.

18 Claims, No Drawings

U.S. PATENT DOCUMENTS

| | | | |
|---|---|---|---|
| 2003/0165015 A1 | 9/2003 | Jahnke | 359/581 |
| 2004/0044099 A1 | 3/2004 | Tucker et al. | 523/160 |
| 2006/0065138 A1* | 3/2006 | Tucker et al. | 101/41 |

FOREIGN PATENT DOCUMENTS

| | | |
|---|---|---|
| EP | 0 584 970 | 7/1993 |
| FR | 1 499 774 | 11/1996 |
| WO | WO 97/41180 | 11/1997 |
| WO | WO 03/040242 | 5/2003 |

OTHER PUBLICATIONS

International Search Report with /Written Opinion, Nov. 7, 2005.

\* cited by examiner

WATER-BASED INKS FOR HYDROGEL LENSES

This application is a continuation of International Patent Application No. PCT/EP05/008159 filed Jul. 27, 2005, which claims the benefits of U.S. provisional patent application No. 60/591,704 filed Jul. 30, 2004.

The present invention is related to water-based inks for making colored hydrogel contact lenses. The present invention is also related to a method for making colored hydrogel contact lenses.

BACKGROUND OF THE INVENTION

A number of inks are known in the art for clichè ink transfer printing of color images on a contact lens. Examples of such inks include those disclosed in U.S. Pat. Nos. 4,668,240, 4,857,072, 5,272,010, and 5,414,477. Processes for making colored lenses using the above inks are substantially similar in that they all require (a) one or more pigments to add colorant to the contact lens; (b) one or more diluents to help the printing ink bind to the contact lens; (c) a binder polymer with appropriate functional groups; and (d) an adhesion promoter to form crosslinks with the functional groups of the binder polymer. The adhesion promoter can also chemically bond the binder polymer to the lens polymer.

Commonly assigned U.S. Patent Application publication No. 2003/0054109 to Quinn, et al. discloses an ink comprising at least one colorant, and a binder polymer having latent crosslinkable pendent groups (e.g., epoxy, hydroxy, alkenyl, isocyanate, peroxy, perester, anhydride, silane, and combinations thereof). Such inks are substantially free of a separate adhesion promoter species (e.g., hexamethylene diisocyanate or hexamethoxymethyl-melamine) and are typically used for hydrophilic contact lenses.

Inks including those disclosed in U.S. Pat. Nos. 4,668,240, 4,857,072, 5,272,010, and 5,414,477 and in U.S. Patent Application publication No. 2003/0054109 may have at least one of the following disadvantages. First, there may be adverse effects of a diluent in the ink mixture that could affect the ink and/or contact lens polymerization. However, a diluent in the ink mixture and subsequently in the contact lens may interfere with the required crosslinking of the binder polymer in the ink to the bulk contact lens. This may be an effect of diluting the concentration of reagents and/or the diluent may react with adhesion promoter to the detriment of the bonding needed to provide adequate adhesion of the colorant to the contact lens. In any case, the capability of the adhesion promoter to provide adequate adhesion of the colorant to the contact lens is diminished when using a poor diluent.

Second, inks described in the prior art may have issues of instability because of reactive functional groups present in adhesion promoter, activators (activating agent or agents), and binder polymers in the inks. Premature reactions may occur between the reactive functional groups, having a negative impact on print quality, ink pot life, and lens adhesion ability of the ink.

Third, inks described in the prior art may need to have an additional agent or a reactive coating to be added during the manufacturing process to promote adhesion of the color coat to a lens. This has all the disadvantages associated with adding an additional ingredient to a manufacturing process.

Fourth, inks described in the prior art may not provide a manufacturer flexbility for curing (gelling) inks or promoting lens adhesion of a color coat. For example, thermal curing is often performed after printing an ink on one of the molding surfaces of a plastic (e.g., polypropylene) disposable mold to react the adhesion promoter with functional groups of the binder polymer. Thermally curing of an ink on a plastic disposable mold prior to lens fabrication might distort the mold and result in a lens of unacceptable quality. In addition, thermal curing of an ink might result in thermal oxidative processes involving polypropylene mold surfaces. As such, thermal curing may negatively affect on cure kinetics and lens quality.

Commonly assigned U.S. Patent Application publication No. 2004/0044099 A1 to Tucker, et al. discloses a pad-transfer printing ink comprising at least one colorant, and a crosslinkable and water-soluble poly(vinyl alcohol). Although such ink is radiation-curable and suitable for producing a high-quality color image on a nelfilcon contact lens using a pad-printing system, it is impractical of producing a high quality color image on a hydroxylethyl-methacrylate (HEMA)-based hydrogel contact lens (i.e., made of a copolymer of hydroxylethyl-methacrylate (HEMA) with other comonomers and/or crosslinkers) without an ink curing step and/or an adhesion promoter (e.g., a diisocyanate). For example, when applying directly to a HEMA-based contact lens, such ink (without an adhesion promoter) does not show adhesion, either after UV and/or thermal cure. Although an adhesion promoter can be added in an ink disclosed in U.S. Patent Application Publication No. 2004/0044099 A1 to provide a good adhesion of the ink to a HEMA-based hydrogel contact lens, premature reactions may occur between the reactive functional groups in the ink and as such, print quality, ink pot life, and lens adhesion ability of the ink may be adversely affected by the presence of the adhesion promotor.

Therefore, there still exist needs for inks and method for printing a high-quality color image on a hydrogel contact lens, in particular, on a HEMA-based hydrogel contact lenses.

SUMMARY OF THE INVENTION

The inks of the present invention are suitable for producing a high-quality color image on a HEMA-based contact lens using a pad-printing system.

The invention, in one aspect, provides an ink comprising water, a water-soluble and actinically and/or thermally-curable binder polymer, and colorant. The ink of the invention has one or more of the following characteristics: a viscosity greater than 50 centipoise (cps); prolonged stability (i.e., stable for at least 8 hours, more preferably at least 2 days, even more preferably at least 7 days, most preferably at least three weeks); an appropriate color level (visible by eye); good adhesion to a HEMA-based hydrogel contact lens; good compatibility with a HEMA-based hydrogel material, and good transferability from a mold to a HEMA-based hydrogel contact lens made in the mold.

In another aspect, the invention provides a method for making a colored hydrogel contact lens, comprising the steps of: (a) applying a color coat to at least a portion of at least one of molding surfaces of a lens mold with an ink, wherein the ink comprises at least one colorant, a water-soluble and actinically-curable binder polymer, and water; (b) optionally curing (i.e., thermally or actinically curing) the ink printed on the mold; (c) dispensing a hydrogel lens-forming material into the lens-forming cavity of the mold; (d) actinically or thermally curing the lens-forming material within the lens-forming cavity to form the contact lens, whereby the colored coat detaches from the molding surface and becomes integral with the body of the contact lens, wherein the colored coat becomes part of one of the anterior and posterior surface of the colored contact lens and has a good adhesion to the lens.

In a further aspect, the present invention provides a method for making a colored hydrogel contact lens, comprising the steps of: (a) providing a contact lens constructed of a hydrogel; (b) applying a color coat to at least a portion of a surface of the lens with an ink, wherein the ink comprises at least one colorant, a water-soluble and actinically-curable binder polymer, and water; and (c) actinically or thermally curing the ink, thereby causing the color coat to adhere to the lens to an extent so that it passes at least a finger rubbing test.

The present invention provides the foregoing and other features, and the advantages of the invention will become further apparent from the following detailed description of the presently preferred embodiments, read in conjunction with the accompanying figures. The detailed description and figures are merely illustrative of the invention and do not limit the scope of the invention, which is defined by the appended claims and equivalents thereof.

DETAILED DESCRIPTION OF EMBODIMENTS OF THE INVENTION

Reference now will be made in detail to the embodiments of the invention. It will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents. Other objects, features and aspects of the present invention are disclosed in or are obvious from the following detailed description. It is to be understood by one of ordinary skill in the art that the present discussion is a description of exemplary embodiments only, and is not intended as limiting the broader aspects of the present invention.

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well known and commonly employed in the art.

The invention is generally related to a method for making a colored hydrogel contact lens.

"Contact Lens" refers to a structure that can be placed on or within a wearer's eye. A contact lens can correct, improve, or alter a user's eyesight, but that need not be the case. A contact lens can be of any appropriate material known in the art or later developed, and can be a soft lens, a hard lens, or a hybrid lens. A contact lens can be in a dry state or a wet state. "Dry State" refers to a soft lens in a state prior to hydration or the state of a hard lens under storage or use conditions. "Wet State" refers to a soft lens in a hydrated state.

The "front or anterior surface" of a contact lens, as used herein, refers to the surface of the lens that faces away from the eye during wear. The anterior surface, which is typically substantially convex, may also be referred to as the front curve of the lens.

The "rear or posterior surface" of a contact lens, as used herein, refers to the surface of the lens that faces towards the eye during wear. The rear surface, which is typically substantially concave, may also be referred to as the base curve of the lens.

A "colored contact lens" refers to a contact lens (hard or soft) having a color image printed thereon. A color image can be a cosmetic pattern, for example, iris-like patterns, Wild Eye™ patterns, made-to-order (MTO) patterns, and the like; an inversion mark that allows a user to handle and insert easily a contact lens; a toric rotation mark, or contact lenses stock keeping units (SKUs), for example, either in forms of numbers or as bar codes. A color image can be a single color image or a multi-color image. A color image is preferably a digital image, but it can also be an analog image.

A colored contact lens can be produced by printing a high-quality color image directly on a contact lens using methods and systems of the invention. A contact lens can be clear before it is printed upon. Alternatively, a contact lens can be tinted prior to being printed upon. That is, a colorant may have been added to that lens using methods that are well known in the art before that lens is printed upon using a printing method of the invention.

A "colored coat" refers to a coating on an object and having a color image printed therein.

"Colorant" means either a dye or a pigment or a mixture thereof that is used to print a color image on an article.

"Dye" means a substance that is soluble in a solvent and that is used to impart color. Dyes are typically translucent and absorb but do not scatter light. Dyes can cover both optical regions of contact lenses and non-optical regions of contact lenses. Nearly any dye can be used in the present invention, so long as it can be used in an apparatus as described below. These dyes include fluorescent dyes, phosphorescent dyes, and conventional dyes.

"Fluorescence" means luminescence caused by absorption of visible light or ultraviolet radiation at one wavelength followed by nearly immediate emission at a longer wavelength. Fluorescent emission ceases almost immediately when the light or incident ultraviolet radiation stops.

"Phosphorescence" is luminescence caused by the absorption of radiation at one wavelength followed by delayed emission at a different wavelength. Phosphorescent emission continues for a prolonged time after the incident radiation stops.

A "pigment" means a powdered substance that is suspended in a liquid in which it is insoluble. Pigments are used to impart color. Pigments, in general, are more opaque than dyes.

The term "a conventional or non-pearlescent pigment" as used herein is intended to describe any absorption pigments that impart color based on the optical principle of diffuse scattering and its color is independent of its geometry. While any suitable non-pearlescent pigment may be employed, it is presently preferred that the non-pearlescent pigment is heat resistant, non-toxic and insoluble in aqueous solutions. Examples of preferred non-pearlescent pigments include any colorant permitted in medical devices and approved by the FDA, such as D&C Blue No. 6, D&C Green No. 6, D&C Violet No. 2, carbazole violet, certain copper complexes, certain chromium oxides, various iron oxides, phthalocyanine (PCN) green, phthalocyanine (PCN) blue, titanium dioxides, etc. See Marmiom DM Handbook of U.S. Colorants for a list of colorants that may be used with the present invention. A more preferred embodiment of a non-pearlescent pigment includes (C.I. is the color index no.), without limitation, for a blue color, phthalocyanine blue (pigment blue 15:3, C.I. 74160), cobalt blue (pigment blue 36, C.I. 77343), Toner cyan BG (Clariant), Permajet blue B2G (Clariant); for a green color, phthalocyanine green (Pigment green 7, C.I. 74260) and chromium sesquioxide; for yellow, red, brown and black colors, various iron oxides; PR122, PY154; for violet, carbazole violet; for black, Monolith black C—K (CIBA Specialty Chemicals).

"Pearlescence" means having a pearly luster; resembling a pearl in physical appearance; or having a nearly neutral slightly bluish medium gray color.

A "pearlescent pigment" refers to a class of interference (effect) pigments, which are transparent thin platelets of low refractive index material (e.g., transparent mica platelets) coated with optically thin coating of a high refractive index material (e.g., metal oxide, such as, for example titanium oxide or iron oxide), and which impart color mainly based on the optical principle of thin-film interference. The optically thin coating of metal oxide can be comprised of single or multiple thin layers of metal oxide. Optically thin coatings applied to the platelets contribute interference effects, which allow the appearance to vary depending upon illumination and viewing conditions. The color is determined by the coating thickness, the refractive index and the angle of illumination. Optically thin coatings are also responsible for the rich deep glossy effect due to partial reflection from and partial transmission through the mica platelets. This class of pigment can provide pearly luster and iridescent effects.

Pearlescent pigments which are mica platelets with an oxide coating are commercially available from by the Englehard Corp. of Iselin, N.J., under the "Mearlin Pigment" line, such as "Hi-Lite Interference Colors," "Dynacolor Pearlescent Pigments", "MagnaPearl", "Flamenco," and "Celini Colors." Additional manufacturers of pearlescent colorants are: Kemira, Inc. in Savannah, Ga., the pigments having the trade name "Flonac Lustre Colors"; and EM Industries, Inc. of Hawthorne, N.Y., the pigments having the trade name "Affair Lustre Pigments".

In the case of pearlescent pigments, it is important during processing to minimize platelet breakage and maintain a sufficient level of dispersion. Pearlescent pigments require gentle handling during mixing and they should not be ground, or subjected to prolonged mixing, milling or high shear since such operations can damage the pigments. Particle size distribution, shape and orientation strongly influence final appearance. Milling, high shear mixing or prolonged processing of pearlescent pigments should be avoided since such operations might lead to delamination of metal oxide coated layer, fragmentation of platelets, platelet agglomeration and platelet compaction. Delamination of metal oxide, compaction, fragmentation and agglomeration will reduce pearlescent effects.

"Stable" in reference to an ink, as used herein, means that the ink has a long pot and shelf life (i.e., stable for at least 8 hours, more preferably at least 2 days, even more preferably at least 7 days, most preferably at least three weeks). Typically stable inks have consistent viscosities over its lifetime, while unstable inks tend to increase viscosity and eventually solidify over time. A stable ink can provide more flexibility in producing colored ophthalmic lenses.

The term "olefinically unsaturated group" is employed herein in a broad sense and is intended to encompass any groups containing at least one >C=C< group. Exemplary ethylenically unsaturated groups include without limitation acryloyl, methacryloyl, allyl, vinyl, styrenyl, or other C=C containing groups.

A "hydrogel" refers to a polymeric material which can absorb at least 10 percent by weight of water when it is fully hydrated. Generally, a hydrogel material is obtained by polymerization or copolymerization of at least one hydrophilic monomer in the presence of or in the absence of additional monomers and/or macromers.

A "HEMA-based hydrogel" refers to a hydrogel obtained by copolymerization of a polymerizable composition comprising HEMA.

A "silicone hydrogel" refers to a hydrogel obtained by copolymerization of a polymerizable composition comprising at least one silicone-containing vinylic monomer or at least one silicone-containing macromer.

"Hydrophilic," as used herein, describes a material or portion thereof that will more readily associate with water than with lipids.

"Ophthalmically compatible", as used herein, refers to a material or surface of a material which may be in intimate contact with the ocular environment for an extended period of time without significantly damaging the ocular environment and without significant user discomfort. Thus, an ophthalmically compatible contact lens will not produce significant corneal swelling, will adequately move on the eye with blinking to promote adequate tear exchange, will not have substantial amounts of protein or lipid adsorption, and will not cause substantial wearer discomfort during the prescribed period of wear.

"Ocular environment", as used herein, refers to ocular fluids (e.g., tear fluid) and ocular tissue (e.g., the cornea) and/or conjunctiva which may come into intimate contact with a contact lens.

A "lens-forming material" refers to a polymerizable composition which can be cured (i.e., polymerized and/or crosslinked) thermally or actinically to obtain a crosslinked polymer. As used herein, "actinically" in reference to curing or polymerizing of a polymerizable composition or material or a lens-forming material means that the curing (e.g., crosslinked and/or polymerized) is performed by actinic irradiation, such as, for example, UV irradiation, ionized radiation (e.g. gamma ray or X-ray irradiation), microwave irradiation, and the like. Thermal curing or actinic curing methods are well-known to a person skilled in the art. Lens-forming materials are well known to a person skilled in the art. Typically, a lens-forming material is a solution or a solvent-free liquid or melt of one or more prepolymers, one or more vinylic monomers, and/or one or more macromers optionally in the presence of various other components, e.g., such as, photoinitiator, inhibitors, fillers, and the like.

A "prepolymer" refers to a starting polymer which can be cured (e.g., crosslinked and/or polymerized) actinically or thermally or chemically to obtain a crosslinked and/or polymerized polymer having a molecular weight much higher than the starting polymer. A "crosslinkable prepolymer" refers to a starting polymer which can be crosslinked upon actinic radiation to obtain a crosslinked polymer having a molecular weight much higher than the starting polymer.

A "monomer" means a low molecular weight compound that can be polymerized. Low molecular weight typically means average molecular weights less than 700 Daltons.

A "vinylic monomer", as used herein, refers to a low molecular weight compound that has an ethylenically unsaturated group and can be polymerized actinically or thermally. Low molecular weight typically means average molecular weights less than 700 Daltons.

A "hydrophilic vinylic monomer", as used herein, refers to a vinylic monomer which as a homopolymer typically yields a polymer that is water-soluble or can absorb at least 10 percent by weight water. Suitable hydrophilic monomers are, without this being an exhaustive list, hydroxyl-substituted lower alkyl ($C_1$ to $C_8$) acrylates and methacrylates, acrylamide, methacrylamide, (lower allyl)acrylamides and-methacrylamides, ethoxylated acrylates and methacrylates, hydroxyl-substituted (lower alkyl)acrylamides and—methacrylamides, hydroxyl-substituted lower alkyl vinyl ethers, sodium vinylsulfonate, sodium styrenesulfonate, 2-acrylamido-2-methylpropanesulfonic acid, N-vinylpyrrole, N-vinyl-2-pyrrolidone, 2-vinyloxazoline, 2-vinyl-4,4'-dialkyloxazolin-5-one, 2-and 4-vinylpyridine, vinylically unsaturated carboxylic acids having a total of 3 to 5 carbon atoms, amino(lower alkyl)-(where the term "amino" also includes quaternary ammonium), mono(lower alkylamino)(lower alkyl) and di(lower alkylamino)(lower alkyl)acrylates and methacrylates, allyl alcohol and the like.

A "hydrophobic vinylic monomer", as used herein, refers to a vinylic monomer which as a homopolymer typically yields a polymer that is insoluble in water and can absorb less than 10 percent by weight water.

A "macromer" refers to a medium and high molecular weight compound or polymer that contains functional groups capable of undergoing further polymerizing/crosslinking reactions. Medium and high molecular weight typically means average molecular weights greater than 700 Daltons. Preferably, a macromer contains ethylenically unsaturated groups and can be polymerized actinically or thermally.

A "polymer" means a material formed by polymerizing/crosslinking one or more monomers.

A "photoinitiator" refers to a chemical that initiates radical crosslinking/polymerizing reaction by the use of light. Suitable photoinitiators include, without limitation, benzoin methyl ether, diethoxyacetophenone, a benzoylphosphine oxide, 1-hydroxycyclohexyl phenyl ketone, Darocure® types, and Irgacure® types, preferably Darocure® 1173, and Irgacure® 2959.

A "thermal initiator" refers to a chemical that initiates radical crosslinking/polymerizing reaction by the use of heat energy. Examples of suitable thermal initiators include, but are not limited to, 2,2'-azobis (2,4-dimethylpentanenitrile), 2,2'-azobis (2-methylpropanenitrile), 2,2'-azobis (2-methylbutanenitrile), peroxides such as benzoyl peroxide, and the like. Preferably, the thermal initiator is 2,2'-azobis(isobutyronitrile) (AIBN).

An "interpenetrating polymer network (IPN)" as used herein refers broadly to an intimate network of two or more polymers at least one of which is either synthesized and/or crosslinked in the presence of the other(s). Techniques for preparing IPN are known to one skilled in the art. For a general procedure, see U.S. Pat. Nos. 4,536,554, 4,983,702, 5,087,392, and 5,656,210. The polymerization is generally carried out at temperatures ranging from about room temperature to about 145° C.

"A binder polymer" refers to a crosslinkable polymer that can be crosslinked by a crosslinker or upon initiation by a chemical or physical means (e.g., moisture, heating, UV irradiation or the like) to trap or bind colorants onto or into a contact lens such as that term is known in the art.

As used herein, "good adhesion to a contact lens" in reference to a colored coat or an ink means that the colored coat (with a color image) generated on the lens with the ink can pass a sterilization-surviving test and at least a finger rubbing test, preferably further pass a sonication-in-methanol (or other suitable solvent, e.g., such as isopropanol) surviving test.

The finger rubbing test is performed by removing the hydrated contact lens from a packaging solution, e.g., saline, and digitally rubbing the lens between either two fingers or a finger and a palm for up to about 10 seconds. Visible and microscopic (~10×) observation of colorant bleeding, smearing, or delamination indicates failure of the rub test.

The sonication-in-methanol (or other suitable solvent, e.g., such as isopropanol) test is performed as follows. A colored contact lens is immersed in 5 ml of, for example, methanol or isopropanol or a suitable solvent, sonicated for about 1 minute and then placed in a vial containing borate buffered saline (BBS). After about 10 seconds, the saline is drained and about 5 ml of fresh BBS is added. After equilibrating for about 5 minutes in the BBS, the lens is inspected for signs of adhesion failure (e.g., colorant bleeding, smearing, or delamination).

"Passing a sterilization-surviving test" means that no significant decoloring or delamination or the like can be observed after sterilization. Production of contact lenses always involve a step of sterilization, such as autoclave, or irradiation with UV light, x-ray, or the like. For example, an autoclave-surviving test can be performed by removing a sterilized contact lens from a packaging solution, e.g., saline, and immersing it into a vial of methanol. The vial containing the hydrated contact lens and methanol is sonicated for 30 seconds using a standard laboratory sonicator. The lens is then removed from the methanol and placed back into the packaging solution. A finger rubbing test is performed on this lens. Observation of bleeding, smearing, or delamination indicates failure of this test.

A "good compatibility with a HEMA-based hydrogel material" in reference to an ink means that a colored image-containing surface of a colored contact lens, obtained according to a print-on-mold process for producing colored contact lenses, appears homogeneous and smooth (no observable wrinkles).

A "print-on-mold process for producing colored contact lenses" refers to a process for molding a colored contact lens described in U.S. Pat. No. 5,034,166 to Rawlings et al.

A "good transferability from a mold to a contact lens" in reference to an ink or a colored coat means that a color image printed on a molding surface of a mold with the ink can be transferred completely onto a contact lens cured (thermally or actinically) in that mold.

In one aspect, the present invention provides an ink for making colored contact lenses, in particular, colored HEMA-based hydrogel contact lenses. The ink of the invention comprises at least one colorant, water and a water-soluble and actinically-curable binder polymer which is a vinyl group-terminated polyurethane polymer, a vinyl group-terminated polyurea binder polymer, or a mixture thereof and is characterized by having a viscosity greater than 50 centipoise (cps), a prolonged stability (i.e., stable for at least 8 hours, more preferably at least 2 days, even more preferably at least 7 days, most preferably at least three weeks), and a good adhesion to a HEMA-based hydrogel contact lens. The ink of the invention preferably further has a good compatibility with a HEMA-based hydrogel material, and/or good transferability from a mold to a HEMA-based hydrogel contact lens made in the mold.

The vinyl group-terminated polyurethane polymer of the invention is a reaction product of (1) an isocyanate-capped polyurethane with an ethylenically unsaturated amine (primary or secondary amine) or an ethylenically unsaturated monohydroxy compound or (2) a hydroxy-capped polyurethane with an isocyanate-containing acrylate or methacrylate. The isocyanate-capped or hydroxy-capped polyurethane is a copolymerization product of a reactive mixture comprising at least one polyalkyleneglycol (or poly(alkylene oxide)) and at least one diisocyanate. The reactive mixture can optionally further comprise at least one compound having at least two hydroxy groups and/or a polyisocyanate.

The vinyl group-terminated polyurea polymer of the invention can be obtained by (1) reacting an acryloylchloride or an isocyanate group-containing acrylate or methacrylate with an amine-capped polyurea or (2) reacting an ethylenically unsaturated amine (primary or secondary amine) or an ethylenically unsaturated monohydroxy compound with an isocyanate-capped polyurea. Terminal amine groups can be primary or secondary amine groups. An amine- or isocyanate-capped polyurea of the invention is a copolymerization product of a reactive mixture comprising at least one poly(oxyalkylene)diamine and at least one diisocyanate. Optionally, the reactive mixture. can further comprises at least one organic di- or poly-amine and/or at least one polyisocyanate.

Exemplary poly(alkylene glycol)s include, but are not limited to a poly(ethylene glycol), a poly(propylene glycol), a poly(ethylene glycol)/poly(propylene glycol) block polymer, a poly(ethylene glycol)/poly(propylene glycol )/poly (butylene glycol) block polymer, a polytetrahydrofuran, a poloxamer, and mixtures thereof.

Poloxamers are hydroxy terminated tri-block copolymers with the structure PEG-PPG-PEG (where "PEG" is poly (ethylene glycol) and "PPG" is poly(propylene glycol)) and are available, for example, under the tradename PLURONIC®. The order of PEG and PPG blocks can be reversed creating block copolymers with the structure PPG-PEG-PPG, which are available, for example, under the tradename PLURONIC-R®. A considerable number of poloxamers is known, differing merely in the molecular weight and in the PEG/PPG ratio. Examples are poloxamer 101, 105, 108, 122, 123, 124, 181, 182, 183, 184, 185, 188, 212, 215, 217, 231, 234, 235, 237, 238, 282, 284, 288, 331, 333, 334, 335, 338, 401, 402, 403 and 407. Poloxamer 101 has a PEG/PPG weight ratio of about 10/90 and poloxamer 108 having a PEG/PPG weight ratio of about 80/20.

Polyoxypropylene-polyoxyethylene block copolymers can also be designed with hydrophilic blocks comprising a random mix of ethylene oxide and propylene oxide repeating units. To maintain the hydrophilic character of the block, ethylene oxide will predominate. Similarly, the hydrophobic block can be a mixture of ethylene oxide and propylene oxide repeating units. Such block copolymers are available under the tradename PLURADOT®.

The weight average molecular weight of poloxamers may vary within wide limits. An average molecular weight of, may be, for example, from about 1000 to 20000, preferably from 1000 to 15000, more preferably from 1000 to 8000 and in particular from 1000 to 5000.

In accordance with the present invention, a diisocyanate can be a linear or branched $C_3$-$C_{24}$ aliphatic diisocyanate, a $C_5$-$C_{24}$ cycloaliphatic or aliphatic-cycloaliphatic diisocyanate, or a $C_6$-$C_{24}$ aromatic or aralphatic diisocyanate. Examples of diisocyanates include methylene dicyclohexyl diisocyanate, hexamethylene diisocyanate, isophorone diisocyanate, toluene-2,4-diisocyanate, toluene-2,4-diisocyanate, mixtures of toluene-2,4 and 2,4-diisocyanates, ethylene diisocyanate, ethylidene diisocyanate, propylene-1,2-diisocyanate, cyclohexylene-1,2-diisocyanate, cyclohexylene-1,4-diisocyanate, m-phenylene diisocyanate, 3,3"-diphenyl-2,4-biphenylene diisocyanate, 2,4"-biphenylene diisocyanate, 2,4"-diphenylmethane diisocyanate, 3,3"-dichloro-4,4"-biphen- ylene diisocyanate, 1,6-hexamethylene diisocyanate, 1,4-tetramethylene diisocyanate, 1,10-decamethylene diisocyanate, cumene-2,4-diisocyanate, 1,5-napthalene diisocyanate, 1,4-cyclohexylene diisocyanate, p-tetramethyl xylylene diisocyanate, p-phenylene diisocyanate, 4-methoxy-1,3-phenylene diisocyanate, 4-chloro-1,3-phenylene diisocyanate, 4-bromo-1,3-phenylene diisocyanate, 4-ethoxy-1,3-phenylene diisocyanate, 2,4-dimethyl-1,3-phenylene diisocyanate, 5,6-dimethyl-1,3-phenylene diisocyanate, 2,4-diisocyanatodiphenylether, 4,4'-diisocyanatodiphenylether, benzidine diisocyanate, 4,6-dimethyl-1,3-phenylene diisocyanate, 9,10-anthracene diisocyanate, 4,4'-diisocyanatodibenzyl, 3,3'-dimethyl-4,4'-diisocyanatodiphenylmethane-2,6-dimethyl-4,4 '-diisocyanatodiphenyl, 2,4-diisocyanatostilbene, 3,3'-dimethoxy-4, 4'-diisoocyanatodiphenyl, 1,4-anthracenediisocyanate, 2,5-fluorenediisocyanate, 1,8-naphthalene diisocyanate, 2,6-diisocyanatobenzofuran, polymeric 4,4'-diphenylmethane diisocyanate, xylylene diisocyanate, and m-tetramethyl xylylene diisocyanate. Examples of especially preferred diisocyanates of formula (3) are isophorone diisocyanate (IPDI), 4,4'-methylenebis (cyclohexyl isocyanate), tolylene-2,4-diisocyanate (TDI), 1,6-diisocyanato-2,2,4-trimethyl-n-hexane (TMDI), methylenebis(cyclohexyl-4-isocyanate), methylenebis(phenyl-isocyanate) or hexamethylene-diisocyanate (HMDI).

Examples of ethylenically unsaturated monohydroxy compound include, without limitation, hydroxy-substituted lower alkylacrylates and -methacrylates, hydroxy-substituted lower alkyl-acrylamides and -methacrylamides, hydroxy-substituted lower alkylvinyl-ethers. Examples of hydroxy-substituted lower alkylacrylates and -methacrylates are 2-hydroxyethyl acrylate and 2-hydroxyethyl methacrylate.

Examples of suitable ethylenically unsaturated amine are 2-(ter-butylamino)ethyl-methacrylate (TBAM), and vinyl aniline.

Examples of compounds having at least two hydroxy groups (polyhydroxy compounds) include, without limitation, glycerol, diglycerol, triglycerol, 1,1,1-trishydroxymethylethane, 1,1,1-trishydroxymethylpropane, 1,2,4-butanetriol, 1,2,6-hexanetriol, erythritol, pentaerythritol, di- and tripentaerythritol, arabitol, sorbitol, disorbitol and mannitol.

An organic diamine can be a linear or branched $C_2$-$C_{24}$ aliphatic diamine, a $C_5$-$C_{24}$ cycloaliphatic or aliphatic-cycloaliphatic diamine, or a $C_6$-$C_{24}$ aromatic or aralphatic diamine. A preferred organic diamine is bis(hydroxyethylene)ethylenediamine (BHEEDA).

Examples of polyamines are symmetrical or asymmetrical dialkylenetriamines or trialkylenetetramines. Preferred polyamines include without limitation diethylenetriamine, N-2'-aminohexyl-1,3 -propylenediamine, N,N-bis(3-aminopropyl)-amine, N,N-bis(6-aminoethyl) amine and triethylenetetramine.

In accordance with the present invention, a polyisocyanate is a compound comprising at least three isocyanate groups. A polyisocyanate can be a linear or branched $C_3$-$C_{24}$ aliphatic polyisocyanate, a $C_5$-$C_{45}$ cycloaliphatic or aliphatic-cycloaliphatic polyisocyanate, or a $C_6$-$C_{24}$ aromatic or aralphatic polyisocyanate. Preferably, a polyisocyanate is a $C_6$-$C_{45}$ cycloaliphatic or aliphatic-cycloaliphatic compound containing 3-6 isocyanate groups and at least one heteroatom selected from the group consisting of oxygen and nitrogen. More preferably, a polyisocyanate is a compound having a group of formula:

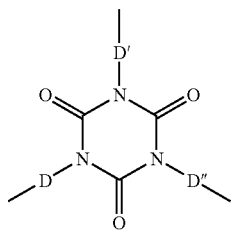

wherein D, D' and D" independent of one another are a linear or branched divalent $C_1$-$C_{12}$ alkyl radical, a divalent $C_5$-$C_{14}$ alkylcycloalkyl radical. Examples of preferred triisocyanates include without limitation the isocyanurate trimer of hexamethylene diisocyanate, 2,4,6-toluene triisocyanate, p, p', p"-triphenylmethane triisocyanate, and the trifunctional trimer (isocyanurate) of isophorone diisocyanate.

Examples of preferred poly(oxyalkylene)diamine include so-called Jeffamines® having an average molecular weight of, for example, approximately from 200 to 5000.

Isocyanate-capped or hydroxy-capped polyurethane polymers can be produced according to any methods known to a person skilled in the art, for example, by reacting all components of the reactive mixture in an inert solvent at a temperature of e.g. from 30° C. to 150° C. or alternatively in a solventless process at its melting temperature or above and preferably under an inert atmosperic environment (for example, in nitrogen or argon atmosphere), preferably in the presence of a catalyst. Suitable inert solvents are aprotic, preferably polar solvents, for example hydrocarbon halides (chloroform, methylene chloride, trichloroethane, tetrachloroethane, chlorobenzene), ethers (tetrahydrofuran, dioxane), ketones (acetone, ethyl methyl ketone, dibutyl ketone, methyl isobutyl ketone), carboxylic acid esters and lactones (ethyl acetate, butyrolactone, valerolactone), alkylated carboxylic acid amides (N,N-dimethylactamide, N-methylpyrrolidone), nitriles (acetonitrile), sulphones and sulphoxides (dimethyl sulphoxide, tetramethylene sulphone). Polar solvents are preferably employed. Suitable catalysts are for example metal salts such as alkali metal salts or tin salts of organic carboxylic acids, or tertiary amines, for example, $(C_1$-$C_6$-alkyl$)_3$N (triethylamine, tri-n-butylamine), N-methylpyrrolidine, N-methylmorpholine, N,N-dimethylpiperidine, pyridine or 1,4-diaza-bicyclooctane. Tin salts have proved to be particularly effective, especially alkyl-tin salts of carboxylic acids, for example dibutyl tin dilaurate (DBTDL) and tin dioctoate. Reaction can be monitored by, for example, monitoring the isocyanate peak in FT-IR spectroscopy.

Amine- or isocyanate-capped polyurea can be prepared according to any methods known to a person skilled in the art, for example, by reacting all components in an aqueous or aqueous-organic medium or organic solvent (e.g, ethyllactate, THF, isopropanol, or the like), at a reaction temperature of from −20 to 85° C. A suitable medium has been found to be especially a mixture of water and a readily water-soluble organic solvent, e.g. an alkanol, such as methanol, ethanol or isopropanol, a cyclic ether, such as tetrahydrofuran (THF), or a ketone, such as acetone.

Dyes may not provide a highly opaque print that pigment can provide. Accordingly, a colorant in an ink of the invention comprises at least one pigment. A colorant also may be a mixture of two or more pigments, which in combination provides a desired color, since any color can be obtained by merely mixing two or more primary colors together, As defined herein, "primary colors" mean cyan, yellow, magenta, white, and black. A colorant may also be a mixture of at least one pigment and at least one dye. A person skill in the art will know how to select colorants.

The choice of pigments is quite flexible, since they need not necessarily contain functional groups. The pigments may be any coloring substance or combination thereof that provides a desired color. Preferred pigments include (C.I. is the color index no.) for a blue color, phthalocyanine blue (pigment blue 15, C.I. 74160), cobalt blue (pigment blue 36, C.I. 77343); for a green color, phthalocyanine green (Pigment green 7, C.I. 74260) and chromium sesquioxide; for yellow, red, brown and black colors, various iron oxides; for violet, carbazole violet. Of course, since any color can be obtained by merely mixing two or more primary colors together, blends of such primary colors are used to achieve the desired shade. Titanium dioxide can be added to the ink to increase the opacity of the pattern.

Pigment(s) are preferably about 5 microns or smaller in size. Larger particles of a pigment can be ground into smaller sizes. Any number of methods known in the art can be used to grind pigment. Exemplary preferred methods of reducing a pigment's particle size include high speed mixers, Kady Mills (rotor stator dispersion device), colloid mills, homogenizers, microfluidizers, sonalators, ultrasonic mills, roll mills, ball mills, roller mills, vibrating ball mills, attritors, sand mills, varikinetic dispensers, three-roll mills, Banbury mixers, or other methods well known to those of skill in the art.

The ink of the invention can also include a thermal initiator or a photoinitiator. The identity of the initiator is not critical and is not part of the present invention. One of ordinary skill in the art will readily recognize the kind and amount of an initiator (photoinitiator or thermoinitiator) that will yield good results in the present invention. Any suitable photoinitiators can be used in the ink formulations. The photoinitiator presently preferred by the inventors is Irgacure 2959, Irgacure 907, Irgacure 500, Irgacure 651, Irgacure 369; Darocure 1173, and Darocure 4265. In addition, combinations of initiators can be used.

The inks of the invention can optionally (but preferably do not) include a crosslinker. A "cross linker" refers to a compound comprising two or more functional groups, as they are known in the art. A cross linker molecule can be used to crosslink two or more monomers or polymer molecules. Cross linkers are known in the art and are disclosed in various U.S. Patents. Such crosslinkers may be added to the ink in order to match the physical properties (e.g. modulus) of the cured ink to that of the cured lens to which it is applied.

The inks of the invention can optionally include a surfactant. The term "surfactant," as used herein, refers to a surface-active compound as that term is known in the art, such as, for example, Surfynol 420 and Surfynol 104 (from Air Products), Pluronic F108 and F38 (from BASF). A surfactant can have one ore more of the following functions: to adjust the surface tension of an ink, to defoam, to improve the separation of pigment particles, and to prevent settling or clumping of pigment particles.

The inks of the invention can optionally (but preferably do not) include an antimicrobial compound. Some suitable antimicrobial materials include polyquaternary ammonium compounds, such as those described in U.S. Pat No. 3,931, 319 to Green et al. (e.g. "POLYQUAT"). Other antimicrobial or antibacterials that can be utilized in the present invention are peptides, other polyquats, mucin, mucin mimics, glycopeptides, glycoproteins, silk proteins, cellulose, dextran or other anti-microbial or anti-bacterial entities.

The ink of the invention can further comprise one or more vinylic monomers or macromers, preferably at least one functionalizing vinylic monomer containing at least one functional group selected from the group consisting of hydroxyl group —OH, amino group —NHR (wherein R is hydrogen or $C_1$ to $C_8$ alkyl), carboxylic group —COOH, epoxy group, amide group —CONHR, and combinations thereof.

The ink of the invention can further comprise one or more components selected from the group consisting of humectants, antioxidant agents, anti-coagulating agents, and other additives known in the art.

The ink of the present invention comprises water as a solvent in an amount sufficient to solubilize the binder polymer and achieve a viscosity above 50 centipoise.

The inks may also (but preferably do not) comprise a solvent in addition to water. The solvent can be any appropriate organic or inorganic solvent. Any known suitable solvents can be used, so long as they do not precipitate the binder polymer, or adversely affect the stability of the colorant. Exemplary solvents include, without limitation, acetone, alcohols (e.g., methanol, ethanol, propanol, isopropanol, etc.), glycols, ketones, esters, cyclopentanone, cyclohexanone, tetrahydrofuran, acetone, methyl-2-pyrrolidone, dimethyl formamide, acetophenone, methylene dichloride, dimethyl sulfoxide, gamma-butyrolactone, ethylene dichloride, isophorone, o-dichlorobenzene, tetrahydrofuran, diacetone alcohol, methyl ethyl ketone, acetone, 2-nitropropane, ethylene glycol monoethyl ether, propylene carbonate, cyclohexanol, chloroform, trichloroethylene, 1,4-dioxane, ethyl acetate, ethylene glycol monobutyl ether, chlorobenzene, nitroethane, ethylene glycol monomethyl ether, butyl acetate, 1-butanol, methyl isobutyl ketone, nitromethane, toluene, ethanol, diethylene glycol, benzene, diethyl ether, ethanolamine, carbon tetrachloride, propylene glycol, hexane, ethylene glycol, and formamide.

The additional solvent may also be a mixture of several organic solvents or a mixture of water and one or more water soluble or water miscible organic components, such as ethylene glycol, propylene glycol, diethylene glycol, glycerine, dipropylene glycol, polyethylene glycol, polypropylene glycol, amides, ethers, urea, substituted ureas, carboxylic acids and their salts, esters, alcohols, organosulfides, organosulfoxides, sulfones (such as sulfolane), alcohol derivatives, carbitol, butyl carbitol, cellosolve, tripropylene glycol monomethyl ether, ether derivatives, amino alcohols, ketones, N-methylpyrrolidinone, 2-pyrrolidinone, cyclohexylpyrrolidone, hydroxyethers, sulfoxides, lactones, polyelectrolytes, methyl sulfonylethanol, imidazole, betaine, and other water soluble or water miscible materials, as well as mixtures thereof.

The viscosity of the binder polymer as it applied to the lens material is important for maintaining print quality. The viscosity of an ink solution can be as high as about 5,000 centipoise (cps), but is preferably between about 1000 to about 3500 cps. The viscosity is preferably above 100 cps; more preferably above 200 cps. Most preferably, the viscosity of the ink is between 250 and 350 cps. If the viscosity is expressed in terms of natural log viscosity, the most preferred range is between 5.5 and 5.9 log (cps).

The proper concentration of binder polymer and the colorant in water to achieve the preferred ink viscosity can be determined, for example, by a design of experiment by modeling the design as a quadratic D-optimal mixture design. This can be done, for example, with a commercial software program, such as Design Expert (v. 6.0.0, from Stat-Ease of Minneapolis, Minn.), according to a similar procedure described in U.S. Patent Application Publication No. 2004/0044099 A1.

An ink of the invention comprises: water in an amount of from about 30% to 98% by weight, preferably from about 50% to 93% by weight; a water-soluble and actinically-curable binder polymer in an amount of from about 2% to 40% by weight, preferably about 6% to 30%; and a colorant in an amount of from about 0.5% to 30% by weight, preferably about 1.5% to 20%. Preferably, the ink further comprises a photoinitiator in an amount of from about 0.05% to 2.0%.

The ink of the invention is actinically or thermally curable to form a colored coat on a contact lens or a molding surface of a mold.

The ink of the present invention also has good adhesion to a hydrogel contact lens, preferably to a HEMA-based hydrogel contact lens.

Without limiting this invention to any particular mechanism or theory, it is believed that the ink binders of the invention can form interpenetrating networks (IPN's) with the lens material of a hydrogel lens. Adhesion of an ink of the invention to the lens by IPN formation does not require the presence of reactive funtional groups in the lens polymer. A color image can be printed directly with an ink of the invention on a preformed hydrogel contact lens to produce a colored contact lens. The printed ink is allowed to penetrate at least partially into the lens material of a contact lens and then cured (cross-linked). The curing can be activated by UV radiation or heat. The binder polymer (i.e., vinyl group-terminated polyurethane and/or polyurea polymers) in the ink is crosslinked in the presence of the lens material of the hydrogel to form IPNs.

It is understood that adhesion between lenses and ink could occur by mechanisms other than IPNs. Where lens materials contain certain types of functionality, direct linkage (bond formation) between binder polymer and lens polymer is possible. For example, lens polymer that contains UV-curable groups (vinyl functionality) would enhance direct linkage of photo-curable ink binder to the lens polymer. Nucleophilic addition reactions would also provide another mode of linking ink binder to lenses. For example, lenses that contain nucleophilic groups (e.g. R-SH) could undergo Michael addition reactions with pendant methacrylate groups in binder polymer. Alternatively binder polymer containing nucleophilic groups (e.g. RSH, NHR*2, R=Alkyl, R*=H, Alkyl) could undergo Michael addition reactions with lens polymer that contains groups such as acrylate or methacrylate. Such reactions would bond the ink to the lens. Furthermore, binder polymer containing nucleophilic groups could undergo reactions with lens polymer that contains electrophilic groups such as epoxy, anhydride, alkyl halide and isocyanate. Alternatively one could bind ink to lenses by having electrophilic groups in the ink binder polymer and nucleophic groups in the lens polymer. Curable inks could also be made be incorporating both nucleophilic and electrophilic functionality into to binder polymer.

If the lens is intended to be natural in appearance, the pattern applied to the lens preferably contains voids. Typically the voids comprise about 5 to about 80% of the pattern's area. On the other hand, it is preferred that the pattern occupy from 50% to all of the area of the lens in the iris region thereof (or that portion of the mold corresponding to the iris region of the lens). If the colorant is opaque, then only the portion of the lens corresponding to the iris is usually printed, leaving the pupil section clear. For lenses that are larger in diameter than the iris, the portion of the lens extending beyond the iris may be left unprinted.

While either the front or rear surface or both may be printed, it is preferable to apply the ink to the front surface of the lens. However, there are special cosmetic effects achievable by providing a pattern on both the anterior and posterior surfaces. For instance, a colored pattern of one color can be applied to the back surface of the lens or the corresponding mold-half (for instance, white) and the same or different colored pattern can be applied to the front surface of the lens or the corresponding mold-half (for instance, dark blue). This then would result in a lens that could have either a multi-color textured appearance for extremely lifelike appearance, or a brighter tint using a white background to reflect back out at the observer.

In accordance with the invention, an ink of the invention can be applied on the molding surface of one or both mold portions by using pad transfer printing (or pad printing) to form a colored coat (with a color image). A colored coat can be applied on the molding surface defining the posterior (concave) surface of a contact lens or on the molding surface defining the anterior surface of a contact lens or on both mold portions. Preferably, a colored coat (with a color image) is applied on the molding surface defining the anterior surface of a contact lens.

After printing an ink of the invention on a molding surface of a mold, the printed ink can be cured by UV or by heat in accordance with the invention. It is desirable that the printed ink is cured thermally or actinically to an extent to minimize loss of pattern definition of the colored coat resulted from subsequent filling of a lens-forming material. It should understood that an ink of the invention should have a good transferability of the colored coat from a mold to a contact lens and a good adhesion to the molded lens.

The good transferability and adhesion may be achieved by crosslinking of the binder polymer to the lens polymer and/or by interpenetrating network formation, during curing of the lens-forming material in the mold.

Preferably, curing of the ink printed on the mold does not consume all of ethylenically unsaturated groups in the ink. Unreacted ethylenically unsaturated groups in the ink can copolymerize with vinylic monomers and/or macromers of the lens forming material when curing the lens forming material in the mold.

If the ink is applied to both sides of a lens by printing on the molding surfaces of both mold halves, one colored coat is formed on each of the molding surfaces of the female and male mold halves. The colored coat is preferably cured partially or completely prior to dispensing of a lens-forming material in the mold. Curing of the lens-forming material in the mold will yield a lens with the colored images on both surfaces.

Producing the lens by polymerization, crosslinking, and/or shaping is well known in the art and is not presently considered a critical part of this invention. Any of the well-known techniques of cast molding and spin casting may be employed.

Methods for printing contact lenses are well known in the art. Typically, a color image can be printed first on a mold for making a contact lens and then a polymerizable or crosslinkable liquid mixture in the mold is cured to form a color contact lens onto which the color image is transferred from the mold. Such a method produces a colored contact lens with smooth surface that may provide more comfort to a wearer. The present invention is related more specifically to ink for pad printing of a color image on an ophthalmic lens, preferably a contact lens, or a mold for making a contact lens.

In pad-transfer printing, a color image is placed or printed on a pad transfer device and the image on the pad transfer device is transferred to another surface, such as a polymer or lens (U.S. Pat. Nos. 3,536,386 to Spivack; 4,582,402 and 4,704,017 to Knapp; 5,034,166 to Rawlings et al. A typical example of this printing follows. An image is etched into metal to form a clichè. The clichè is placed in a printer. Once in the printer, the clich èis inked by either an open inkwell doctoring system or by a closed ink cup sliding across the image. Then, a silicone pad picks up the inked image from the clichè and transfers the image to the contact lens. The silicone pads are made of a material comprising silicone that can vary in elasticity. The properties of the silicone material permit the inks to stick to the pad temporarily and fully release from the pad when it contacts a contact lens or a mold. Appropriate pad-transfer printing structures include, but are not limited to, Tampo-type printing structures (Tampo vario 90/130), rubber stamps, thimbles, doctors blade, direct printing, or transfer printing as they are known in the art.

In another aspect, the present invention comprises a method for making a colored hydrogel contact lens, comprising the steps of: (a) applying a colored coat to at least a portion of at least one of molding surfaces of a lens mold with an ink of the invention (described above); (b) partially or completely curing, by actinic radiation or by heat, the ink printed on the mold; (c) dispensing a hydrogel lens-forming material into the lens-forming cavity of the mold; (d) actinically or thermally curing the lens-forming material within the lens-forming cavity to form the contact lens, whereby the colored coat detaches from the molding surface and becomes integral with the body of the contact lens, wherein the colored coat becomes part of one of the anterior and posterior surface of the colored contact lens and has a good adhesion to the lens.

Methods of manufacturing mold sections for cast-molding a contact lens are generally well known to those of ordinary skill in the art. The process of the present invention is not limited to any particular method of forming a mold. In fact, any method of forming a mold can be used in the present invention. However, for illustrative purposes, the following discussion has been provided as one embodiment of forming a mold on which a colored coat can be applied thereon in accordance with the present invention.

In general, a mold comprises at least two mold sections (or portions) or mold halves, i.e. first and second mold halves. The first mold half defines a first molding (or optical) surface and the second mold half defines a second molding (or optical) surface. The first and second mold halves are configured to receive each other such that a lens forming cavity is formed between the first molding surface and the second molding surface. The molding surface of a mold half is the cavity-forming surface of the mold and in direct contact with lens-forming material.

The first and second mold halves can be formed through various techniques, such as injection molding. These half sections can later be joined together such that a cavity forms therebetween. Thereafter, a contact lens can be formed within the cavity of the mold sections using various processing techniques, such as actinic or thermal curing. Examples of suitable processes for forming the mold halves are disclosed in U.S. Pat. No. 4,444,711 to Schad; U.S. Pat.

No. 4,460,534 to Boehm et al.; U.S. Pat No. 5,843,346 to Morrill; and U.S. Pat. No. 5,894,002 to Boneberger et al.

Virtually all materials known in the art for making molds can be used to make molds for making contact lenses. For example, polymeric materials, such as polyethylene, polypropylene, and PMMA can be used. Other materials that allow UV light transmission could be used, such as quartz glass.

In processes where printing speed is relatively slow and an inked cliché is exposed to air for relatively long cycle time, it will be desirable to take measures known to a person skilled in the art to minimize water evaporation.

Alternatively, a color image can be printed directly with an ink of the invention on a preformed hydrogel contact lens to produce a colored contact lens. The printed ink is allowed to penetrate at least partially into the lens material of a contact lens and then cured (cross-linked). The curing can be activated by UV radiation or heat. The binder polymer in the ink is crosslinked in the presence of the lens material of the hydrogel to form IPNs.

In a further aspect, the present invention provides a method for making a colored hydrogel contact lens, comprising the steps of: (a) providing a contact lens constructed of a hydrogel; (b) applying a color coat to at least a portion of a surface of the lens with an ink of the invention (described above); and (c) actinically or thermally curing the ink to form the colored hydrogel contact lens having the color coat adhered to the lens, wherein the adhesion of the colored coat to the lens is characterized by passing at least a finger rubbing test.

This invention has utility for production of colored hydrogel contact lenses. Such lenses can be extended-wear contact lenses, daily-wear contact lenses, and/or ocular prosthetic devices.

The previous disclosure will enable one having ordinary skill in the art to practice the invention. In order to better enable the reader to understand specific embodiments and the advantages thereof, reference to the following examples is suggested. The percentages in the formulations are based on weight percentages unless otherwise specified.

EXAMPLE 1

Poly(ethylene glycol) (PEG 1450 and PEG 1000) from Aldrich are deionized by mixing with Dowex MR-3 ion exchange resin (5:1 polymer:resin ratio by weight) for 24 hours at 60° C. The resin is filtered. Low boiling components are removed by rotary evaporation at 60° C. under vacuum for 2 hours. The purified polymer is dried over activated 3 angstrom molecular sieves for 3 days at 60° C.

Into a 2-neck round bottom flask are weighed 27.750 g PEG 1450, 6.382 g PEG 1000, 0.685 g trimethylol propane, and 9.072 g isophorone diisocyanate. The flask is equipped with a mechanical stirrer and a nitrogen inlet and is placed into a water/oil bath at 75° C. After 21 hours of reaction time, the reaction is completed as determined by isocyanate concentration analysis.

To 8.429 g of the above formulation which is melted at 60° C., 0.563 t- butylaminoethyl-methacrylate is added. The reaction mixture is mixed for about 30 minutes while periodically placing the mixture into a 60° C. oven to reduce the viscosity. IR analysis confirms near complete conversion of the isocyanate to obtain methacrylate-capped polyurethane polymer. To 8.861 g of the methacrylate-capped polyurethane, 20.5 g of deionized water is added and mixed thoroughly to make a clear solution with 30% solid content.

5.9501 g of this aqueous solution is mixed with 0.0061 g Irgacure 2959 to give a photopolymerizable solution.

EXAMPLE 2

3.18 g of the photopolymerizable solution (containing about 30% of methacrylate-capped polyurethane polymer and 0.1% of Irgacure) prepared in Example I is mixed with 4.84 g of water. The solution, under shaking, produces a lot of foam and it is necessary to wait few hours to obtain a clear solution. The viscosity is about 230 cps. The final solution contain 11% of methacrylate-capped polyurethane polymer.

To this solution, 234 mg of PCN blue are added (about 2.8%) and the mixture is shaken to obtain an homogeneous dispersion (ink). Also, in this case, it is necessary to wait few hours to let the form disappear. The resultant ink is stable for about a week (i.e., a prolonged stability of about one week).

The resultant ink is used in pad-printing of male molds for making FreshLook® contact lenses (CIBA Vision). After printing (without ink curing) on male mold halves, female molds are filled with a lens-forming material for making FreshLook® contact lenses. A male mold half with a colored coat is mated with a female mold half and then closed. The closed molds with lens-forming material are exposed to UV radiation for 2 hours. The molds are then opened and post-cured at 85° C. for 45 minutes. Lenses are demolded, put in hydration solution for 45 minutes, then autoclaved at 135° C. for 45 minutes. The transfer of the colored coat from the mold to the lens is total, but the definition of the colored pattern in the colored coat is partially lost. The surfaces of the lenses are smooth: they do not show wrinkles like in the case where the ink of the present invention is replaced by an ink with crosslinkable PVA (disclosed in U.S. Patent Application publication No. 2004/0044099A1). The two polymers (polyurethane and HEMA-based hydrogel) seem to be more compatible. It is believed that loss in definition of the colored pattern in the colored coat probably occurs during the dispensing of the lens-forming material in the mold. It is thus preferably that the colored coat printed on a mold is at least partially cured actinically to preserve the definition of colored pattern in the colored coat.

However, it is found that if a lens-forming material is thermally cured, instead of UV cured, in a mold having a colored coat printed with an ink including crosslinkable PVA, few winkles are observed. This indicates that an ink with crosslinkable PVA (disclosed in U.S. Patent Application publication No. 2004/0044099 A1) may be used in a print-on-mold process involving thermal curing of a lens-forming material in a mold for producing a colored contact lens.

The same ink is also used to pad print FreshLook® Lenses. The ink can be cured by UV irradiation or thermally. When first UV cured for 7 seconds with a Dr. Gröbbel lamp followed by a post-cure at 85° C. for 45 minutes, the ink show good adhesion to lens (passing repeat rubbing tests, methanol swellings and autoclaving. The PCN blue pigment is successfully trapped by the polyurethane network. The pattern definition is almost preserved.

Although various embodiments of the invention have been described using specific terms, devices, and methods, such description is for illustrative purposes only. The words used are words of description rather than of limitation. It is to be understood that changes and variations may be made by those skilled in the art without departing from the spirit or scope of the present invention, which is set forth in the following claims. In addition, it should be understood that aspects of the various embodiments may be interchanged either in whole or in part. Therefore, the spirit and scope of the appended claims should not be limited to the description of the preferred versions contained therein.

The invention claimed is:

1. An ink for making colored contact lenses, comprising: water;
at least one colorant; and
a water-soluble and actinically-curable binder polymer which is a vinyl group-terminated polyurethane polymer, a vinyl group-terminated polyurea binder polymer, or a mixture thereof,
wherein the vinyl group-terminated polyurethane polymer is a reaction product of:
an isocyanate-capped polyurethane with an ethylenically unsaturated amine (primary or secondary amine) or an ethylenically unsaturated monohydroxy compound, or
a hydroxy-capped polyurethane with an isocyanate-containing acrylate or methacrylate,
wherein the isocyanate-capped or hydroxy-capped polyurethane is a copolymerization product of a reactive mixture comprising at least one polyalkyleneglycol and at least one diisocyanate,
wherein the vinyl group-terminated polyurea polymer is obtained
by reacting an acryloylchloride or an isocyanate group-containing acrylate or methacrylate with an amine-capped polyurea, or
by reacting an ethylenically unsaturated amine (primary or secondary) or an ethylenically unsaturated monohydroxy organic compound with an isocyanate-capped polyurea,
wherein the amine- or isocyanate-capped polyurea is a copolymerization product of a reactive mixture comprising at least one poly(oxyalkylene)diamine and at least one diisocyanate, and
wherein the ink is characterized by having a viscosity greater than 50 centipoise (cps), a prolonged stability of at least 8 hours, and a good adhesion to a HEMA-based hydrogel contact lens.

2. The ink of claim 1, wherein the ink having a stability of at least 2 days.

3. The ink of claim 2, wherein the ink is further characterized by having a good compatibility with a HEMA-based hydrogel material and/or good transferability from a mold to a HEMA-based hydrogel contact lens made in the mold.

4. The ink of claim 1, wherein the viscosity is from 1000 to about 3500 cps.

5. The ink of claim 1, wherein water is present in an amount of from about 30% and 98% by weight of the ink, wherein the water-soluble and actinically-curable binder polymer is present in an amount of from about 2% to about 40% by weight of the ink, and wherein the colorant is present in an amount from about 0.5% to about 30% by weight of the ink.

6. The ink of claim 5, wherein the colorant comprises at least a pigment and/or at least a dye.

7. The ink of claim 5, wherein the colorant comprises at least a pigment and optionally a dye.

8. The ink of claim 6, wherein the pigment is selected from the group consisting of PY1, PY3, PY34, PY35, PY37, PY40, FY53, PY65, PY83, PY95, PY97, PY108PY110, PY120, PY138, PY 139, PY150, PY151, PY153, PY154, PY175, PY184, PR60, PR83, PR88 PR122, PR171, PR176, PR177, PR202, PR264, NR4, NR9, PV11, PV19, PV42, PB15:1, PB15:3, PB15:6, PB16, PB17, PB27, PB28, PB29, PB33, PB35, PB36, PB60, PB72, Pb73, PB74, PBk1, PBk6, PBk7, PBk8, PBk9, PBk10, PBk11, PBk19, PBk31, PW4, PW6, D&C Blue No. 6, D&C Green No. 6, D&C Violet No. 2, carbazole violet, phthalocyanine green, copper complexes, certain chromium oxides, various iron oxides, phthalocyanine blue, titanium dioxides, cobalt blue, Toner cyan BG, Permajet blue B2G, chromium sesquioxide, Monolith black C-K, Red 122, and Yellow 154.

9. The ink of claim 6, further comprising one or more components selected from the group consisting of a photo-initiator, a thermal initiator, a crosslinker, a surfactant, a vinylic monomer, a humectant, an antioxidant agent, an anti-coagulating agent, and other additives known in the art.

10. The ink of claim 6, wherein the binder polymer is a vinyl group-terminated polyurethane polymer which is a reaction product of: (1) an isocyanate-capped polyurethane with an ethylenically unsaturated primary or secondary organic amine or (2) a hydroxy-capped polyurethane with an isocyanate-containing acrylate or methacrylate, wherein the isocyanate-capped or hydroxy-capped polyurethane is a copolymerization product of a reactive mixture comprising at least one polyalkyleneglycol, at least one diisocyanate, optionally a tri- or poly-hydroxy compound, and optionally a tri- or poly-isocyanate.

11. The ink of claim 6, wherein the binder polymer is a vinyl group-terminated polyurea polymer obtained by: (1) reacting an acryloylchloride or an isocyanate group-containing acrylate or methacrylate with an amine-capped polyurea; or (2) reacting an ethylenically unsaturated amine (primary or secondary) or an ethylenically unsaturated monohydroxy organic compound with an isocyanate-capped polyurea, wherein the amine- or isocyanate-capped polyurea is a copolymerization product of a reactive mixture comprising at least one poly(oxyalkylene)diamine, at least one diisocyanate, optionally a tri- or poly-amine, and optionally a tri- or poly-isocyanate.

12. A method for making a colored hydrogel contact lens, comprising the steps of:
(a) applying a color coat to at least a portion of at least one of the molding surfaces of a lens mold with an ink,
wherein the ink comprises at least one colorant, a water-soluble and actinically-curable binder polymer which is a vinyl group-terminated polyurethane polymer, a vinyl group-terminated polyurea binder polymer, or a mixture thereof,
wherein the vinyl group-terminated polyurethane polymer is a reaction product of an isocyanate-capped polyurethane with an ethylenically unsaturated amine (primary or secondary amine) or an ethylenically unsaturated monohydroxy compound, or a hydroxy-capped polyurethane with an isocyanate-containing acrylate or methacrylate,
wherein the isocyanate-capped or hydroxy-capped polyurethane is a copolymerization product of a reactive mixture comprising at least one polyalkyleneglycol and at least one diisocyanate,
wherein the vinyl group-terminated polyurea polymer is obtained by reacting an acryloylchloride or an isocyanate group-containing acrylate or methacrylate with an amine-capped polyurea, or
by reacting an ethylenically unsaturated amine (primary or secondary) or an ethylenically unsaturated monohydroxy organic compound with an isocyanate-capped polyurea,
wherein the amine- or isocyanate-capped polyurea is a copolymerization product of a reactive mixture comprising at least one poly(oxyalkylene)diamine and at least one diisocyanate, and wherein the ink is characterized by having a viscosity greater than 50 centipoise (cps), a prolonged stability of at least 8 hours, and a good adhesion to a HEMA-based hydrogel contact lens;

(b) partially or completely curing, by actinic radiation or by heat, the ink on the mold by actinic radiation;

(c) dispensing a hydrogel lens-forming material into the lens-forming cavity of the mold; and (d) actinically or thermally curing the hydrogel lens-forming material within the lens-forming cavity to form the colored hydrogel contact lens, wherein the colored coat detaches from the molding surface and becomes part of one of the anterior and posterior surface of the colored hydrogel contact lens, and wherein the colored coat has a good adhesion to the lens.

13. The method of claim 12, wherein the lens-forming material comprises at least HEMA.

14. The method of claim 12, wherein the color coat is applied to at least a portion of the molding surface of a female mold half, wherein the molding surface of the female mold half defines the anterior surface of the colored hydrogel contact lens.

15. The method of claim 12, wherein curing of the ink printed on the mold does not consume all of ethylenically unsaturated groups in the ink.

16. A method for making a colored hydrogel contact lens, comprising the steps of:

(a) providing a contact lens constructed of a hydrogel;

(b) applying a color coat to at least a portion of a surface of the lens with an ink, wherein the ink comprises at least one colorant, a water-soluble and actinically-curable binder polymer which is a vinyl group-terminated polyurethane polymer, a vinyl group-terminated polyurea binder polymer, or a mixture thereof, wherein the vinyl group-terminated polyurethane polymer is a reaction product of an isocyanate-capped polyurethane with an ethylenically unsaturated amine (primary or secondary amine) or an ethylenically unsaturated monohydroxy compound, or a hydroxy-capped polyurethane with an isocyanate-containing acrylate or methacrylate, wherein the isocyanate-capped or hydroxy-capped polyurethane is a copolymerization product of a reactive mixture comprising at least one polyalkyleneglycol and at least one diisocyanate, wherein the vinyl group-terminated polyurea polymer is obtained by reacting an acryloylchloride or an isocyanate group-containing acrylate or methacrylate with an amine-capped polyurea, or by reacting an ethylenically unsaturated amine (primary or secondary) or an ethylenically unsaturated monohydroxy organic compound with an isocyanate-capped polyurea, wherein the amine- or isocyanate-capped polyurea is a copolymerization product of a reactive mixture comprising at least one poly(oxyalkylene)diamine and at least one diisocyanate, and wherein the ink is characterized by having a viscosity greater than 50 centipoise, a prolonged stability of at least 8 hours, and a good adhesion to a HEMA-based hydrogel contact lens; and (c) actinically or thermally curing the ink to form the colored hydrogel contact lens having the color coat adhered to the lens, wherein the adhesion of the colored coat to the lens is characterized by passing at least a finger rubbing test.

17. The method of claim 16, wherein the color coat is applied to at least a portion of the anterior surface of the colored hydrogel contact lens.

18. The method of claim 16, wherein the contact lens comprise a HEMA-based hydrogel material.

* * * * *